Patented May 2, 1939

2,156,457

UNITED STATES PATENT OFFICE 2,156,457

MULTICELLULAR GLASS AND METHOD FOR ITS MANUFACTURE

Bernard Long, Paris, France, assignor to Societe Anonyme des Manufactures des Glaces & Produits Chimiques de Saint-Gobain, Chauny & Cirey, Paris, France No Drawing. Application June 2, 1936, Serial No. 83,077. In France June 5, 1935

15 Claims. (Cl. 49—79)

The present invention relates to a method for the manufacture of multicellular glass or sponge-like glass i. e. a vitrified substance comprising a great number of adjacent cells which are preferably devoid of communication with each other. The presence of these cells gives to the product remarkable properties and particularly a small apparent specific weight or density and heat and sound insulating properties which render it useful for a variety of different purposes, for example in the building industry.

To manufacture such glass it has been already proposed to fuse vitrifiable substances containing boric acid, carbonaceous substances and titanium oxide, and to bring the glass so formed close to its softening temperature either by cooling it from the melting temperature or by reheating it after it has been solidified.

The multicellular glass thus produced has the desired properties but its manufacture necessitates a substantial proportion of boric acid.

The present invention has for its aim to manufacture multicellular glass with the vitrifiable substances which are used to make ordinary industrial sodo-calcic glasses thus avoiding the use of boric acid.

The method according to the invention consists in mixing these substances with a powder of a reducing metal, such as aluminium, and one or several metallic oxides having the property of being dissociated under the action of high temperature, such as for example, titanium dioxide (TiO₂), manganese dioxide (MnO₂), chromic oxide (CrO₃), and in fusing such mixture. The resulting glass material is then brought to a temperature close to its softening point, either by cooling it from the fusion temperature, or by reheating it after it has been solidified, and maintained at said temperature during a sufficient time to allow the gas to develop within the glassy mass, this being generally done after a few minutes. Obviously the metallic oxide which has the property of being dissociated at a high temperature is contained in the finished article.

It has been found advantageous to use vitrifiable materials devoid of sulphates or nitrates.

When the process is carried out by cooling a fused glass down to the softening temperature ranges, a determined glass mass is taken from the melting crucible or tank and poured in a mold which is maintained at a convenient temperature.

When the process is carried out by reheating a solidified glass to the softening temperature ranges, pieces or lumps of the solidified glass material may be placed in molds, for example in cast-iron molds, and heated to the proper temperature. Said molds may advantageously be heated previously.

In both cases the swelling of the glass material determines an increase of the volume of the glass mass or of the glass block in the mold.

In practice, the weight of glass is determined in accordance with the dimensions of the mold in such a manner that at the end of the swelling, the glass material fills the entire volume of said mold. The swelling may be rendered more important or easier by diminishing the pressure above the glass material, this vacuum being applied either during or immediately after the swelling of the glass.

At the end of the operation, the multicellular glass block is removed from the mold and annealed in the ordinary manner.

By way of example, a glass produced by melting the following mixture:

| | |
|---|---|
| Sand | 852 |
| Sodium carbonate | 375 |
| Limestone | 195 |
| Titanium dioxide | 24 |
| Aluminium powder | 5 | gives, by mere reheating at a temperature close to 700° C. without the action of a vacuum, a multicellular glass having a density of 1.30.

With the action of vacuum the density of the resulting product may be much reduced and may in certain cases fall to 0.50.

The process of the present invention may be carried out with metals other than aluminium having great reducing properties, for example magnesium.

I claim:

1. A method of manufacturing multicellular glass comprising incorporating in a sodo calcic glass batch a powder of a reducing metal and at least one metallic oxide having the property of being dissociated under the action of the temperature, fusing said glass batch and subsequently maintaining the resulting glass material close to its softening temperature so as to cause said glass material to swell and form a sponge like or multicellular structure.

2. A method of manufacturing multicellular glass comprising incorporating in a sodo-calcic glass batch, aluminium powder and at least one metallic oxide having the property of being dissociated under the action of temperature, fusing said glass batch and subsequently maintaining the resulting glass material close to its softening temperature so as to cause said glass material to swell and form a sponge like or multicellular structure.

3. A method of manufacturing multicellular glass comprising incorporating in a sodo-calcic glass batch magnesium powder and at least one metallic oxide having the property of being dissociated under the action of temperature, fusing said glass batch and subsequently maintaining the resulting glass material close to its softening temperature so as to cause said glass material to swell and form a sponge like or multicellular structure.

4. A method of manufacturing multicellular glass comprising incorporating in a sodo calcic glass batch, aluminium powder and at least one metallic oxide having the property of being dissociated at high temperature, fusing said glass batch, then solidifying the fused material and subsequently reheating said solidified glass material close to its softening temperature, and maintaining it at such temperature to cause said glass material to swell and take a multicellular structure.

5. A method of manufacturing multicellular glass comprising incorporating in a sodo calcic glass batch, aluminium powder and at least one metallic oxide having the property of being dissociated at high temperature, fusing said glass batch and keeping the resulting product close to its softening temperature and, at least during a part of the time while the glass is maintained close to the softening temperature, diminishing the exterior pressure to cause said glass material to swell and take a multicellular structure.

6. A method of manufacturing multicellular glass comprising incorporating in a sodo calcic glass batch, aluminium powder and at least one metallic oxide having the property of being dissociated at high temperature, fusing said glass batch and keeping the resulting product close to its softening temperature and afterwards diminishing the exterior pressure to cause the glass material to swell and take a multicellular structure.

7. A method of manufacturing multicellular glass comprising incorporating in a sodo calcic glass batch devoid of sulphates and nitrates, aluminium powder and titanium dioxide, fusing said glass batch and subsequently maintaining the resulting glass material close to its softening temperature so as to cause said glass material to swell and form a sponge like or multicellular structure.

8. A method of manufacturing multicellular glass comprising incorporating in a sodo calcic glass batch devoid of sulphates and nitrates, aluminium powder and manganese dioxide, fusing said glass batch and subsequently maintaining the resulting glass material close to its softening temperature so as to cause said glass material to swell and form a sponge like or multicellular structure.

9. A method of manufacturing multicellular glass comprising incorporating in a sodo calcic glass batch devoid of sulphates and nitrates, aluminium powder and chromic oxide, fusing said glass batch and subsequently maintaining the resulting glass material close to its softening temperature so as to cause said glass material to swell and form a sponge like or multicellular structure.

10. As an article of manufacture, a sponge-like multicellular glass comprising an oxidized reducing metal and at least one metallic oxide having the property of being dissociated at high temperature.

11. As an article of manufacture, a sponge-like multicellular glass comprising oxidized aluminum and at least one metallic oxide having the property of being dissociated at high temperature.

12. As an article of manufacture, a sponge-like multicellular glass comprising oxidized magnesium and at least one metallic oxide having the property of being dissociated at high temperature.

13. As an article of manufacture, a sponge-like multicellular glass comprising oxidized aluminum and dioxide of titanium.

14. As an article of manufacture, a sponge-like multicellular glass comprising oxidized aluminum and dioxide of manganese.

15. As an article of manufacture, a sponge-like multicellular glass comprising oxidized aluminum and chromic oxide.

BERNARD LONG.